May 9, 1961 G. W. MUNNS, JR., ET AL 2,983,667
PROCESS FOR UPGRADING PETROLEUM NAPHTHAS
Filed Dec. 10, 1958 8 Sheets-Sheet 5

INVENTORS
George W. Munns, Jr.
Claude G. Myers
BY Paul B. Weisz
Raymond W. Barclay
ATTORNEY INVENTORS
George W. Munns, Jr.
Claude G. Myers
BY Paul B. Weisz
ATTORNEY May 9, 1961  G. W. MUNNS, JR., ET AL  2,983,667
PROCESS FOR UPGRADING PETROLEUM NAPHTHAS
Filed Dec. 10, 1958  8 Sheets-Sheet 8

INVENTORS
George W. Munns, Jr.
Claude G. Myers
BY Paul B. Weiss
Raymond W. Barclay
ATTORNEY United States Patent Office 2,983,667
Patented May 9, 1961

2,983,667

PROCESS FOR UPGRADING PETROLEUM NAPHTHAS

George W. Munns, Jr., West Deptford Township, Gloucester County, and Claude G. Myers, Pitman, N.J., and Paul B. Weisz, Media, Pa., assignors to Socony Mobil Oil Company, Inc., a corporation of New York Filed Dec. 10, 1958, Ser. No. 779,465

9 Claims. (Cl. 208—66)

This invention relates to a process for upgrading petroleum naphthas and more particularly is concerned with a process for effecting conversion of $C_6$ aliphatic hydrocarbons to lower molecular weight products of enhanced octane number.

Aliphatic $C_6$ hydrocarbons derived from oil field or refinery fractions are conventionally upgraded in octane number by reforming or by isomerization. The liquid fuel components produced in accordance with these methods, however, have been of limited octane number improvement.

It is a major object of the invention described herein to provide a more efficient utilization of available $C_6$ aliphatic hydrocarbons, octane number-wise, than is presently practiced in the industry.

The above and other objects which will be apparent to those skilled in the art are realized by the process of this invention. Broadly, the method of the invention comprises a unique process for converting aliphatic $C_6$ hydrocarbons to iso-pentane, isobutane or a mixture of the two by particularly combined steps of reforming, demethylation and isomerization. Iso-pentane so produced is characterized by a leaded blending octane number in accordance with the research method (F-1+3 cc. TEL) of 102. Isobutane produced is suitable for use in paraffin alkylation to yield a product of 102 to 106 leaded blending octane number.

In one embodiment, the present invention provides for a method for improving the quality, octane number-wise, of a $C_6$-containing petroleum hydrocarbon mixture by subjecting the same to reforming, separating the resulting reformer effluent into (1) light gaseous products including hydrogen and $C_1$ to $C_3$ hydrocarbons and, (2) $C_4$ and heavier liquid products; conducting the latter to a fractionation zone, removing and collecting a $C_4$ fraction as overhead, removing and collecting $C_7$ and heavier hydrocarbons as bottoms and removing an intermediate fraction consisting essentially of $C_6$ hydrocarbons; subjecting such intermediate fraction to demethylation; separating the demethylation effluent into light gaseous products including hydrogen and $C_1$ to $C_3$ hydrocarbons and recycling the remaining liquid demethylated product to extinction in said fractionation zone to produce principally a mixture of pentanes; separating the resulting mixture into an iso-pentane fraction and into a normal pentane fraction; subjecting the latter to isomerization; separating the isomerization effluent into light gaseous products including hydrogen and $C_1$ to $C_3$ hydrocarbons and recycling the remaining product to said fractionation zone; combining the light gaseous products resulting from the aforementioned reforming, demethylation and isomerization steps, separating hydrogen from said combined products and recycling apportioned streams of said separated hydrogen to the reforming, demethylation and isomerization operations.

In another embodiment, the present invention provides for a method which takes into account the presence of small concentrations of neohexane having a leaded blending octane number of 107 in the reformer effluent. In order to preserve this high octane number material from degradation to neo-pentane in the demethylation step, a hexane distillation step is introduced wherein neo-hexane (boiling point of 50° C.) is separated from all of the other hexanes (boiling point of 58° C. or higher).

In still another embodiment of the invention a method is provided for conducting the desired pentane isomerization in the reforming zone. In accordance with this embodiment, the reformer itself is used to isomerize the normal pentane produced during the $C_6$ demethylation step. Recycling this normal pentane product to the reformer eliminates the use of a separate isomerization reactor.

In still a further embodiment, the invention provides a process wherein normal hexane is initially separated from other hexanes and the separated normal hexane as well as normal pentane are isomerized in the reformer itself.

In yet another embodiment of the invention, a process is provided involving use of crystalline zeolites of uniform pore size for effecting separation of mixed hexanes and pentanes. The use of the crystalline zeolites, known commercially as molecular sieves, has been found to afford a significant process simplification whenever both hexanes and pentanes require separation into normal components and their isomers. The mixed hexanes and pentanes in such instance may be separated with a molecular sieve crystalline zeolite into a mixture of normal hexane and normal pentane on the one hand, and a mixture of iso-hexane and iso-pentane on the other hand. Subsequent separation of normal pentane from normal hexane and subsequent separation of iso-pentane from iso-hexanes by distillation are much more easily carried out than the otherwise required distillations of iso-pentane from normal pentane and of iso-hexanes from normal hexane.

In another embodiment of the invention, iso-butane is produced from $C_6$ aliphatic hydrocarbons. In this embodiment, the reformer is used to isomerize the normal pentane produced by demethylation of the $C_6$ hydrocarbons, the normal pentane being recycled to extinction. The iso-pentane, thus produced, is demethylated being recycled to produce mainly iso-butane.

The invention may be more particularly understood by reference to the attached drawings wherein.

Figure 1:
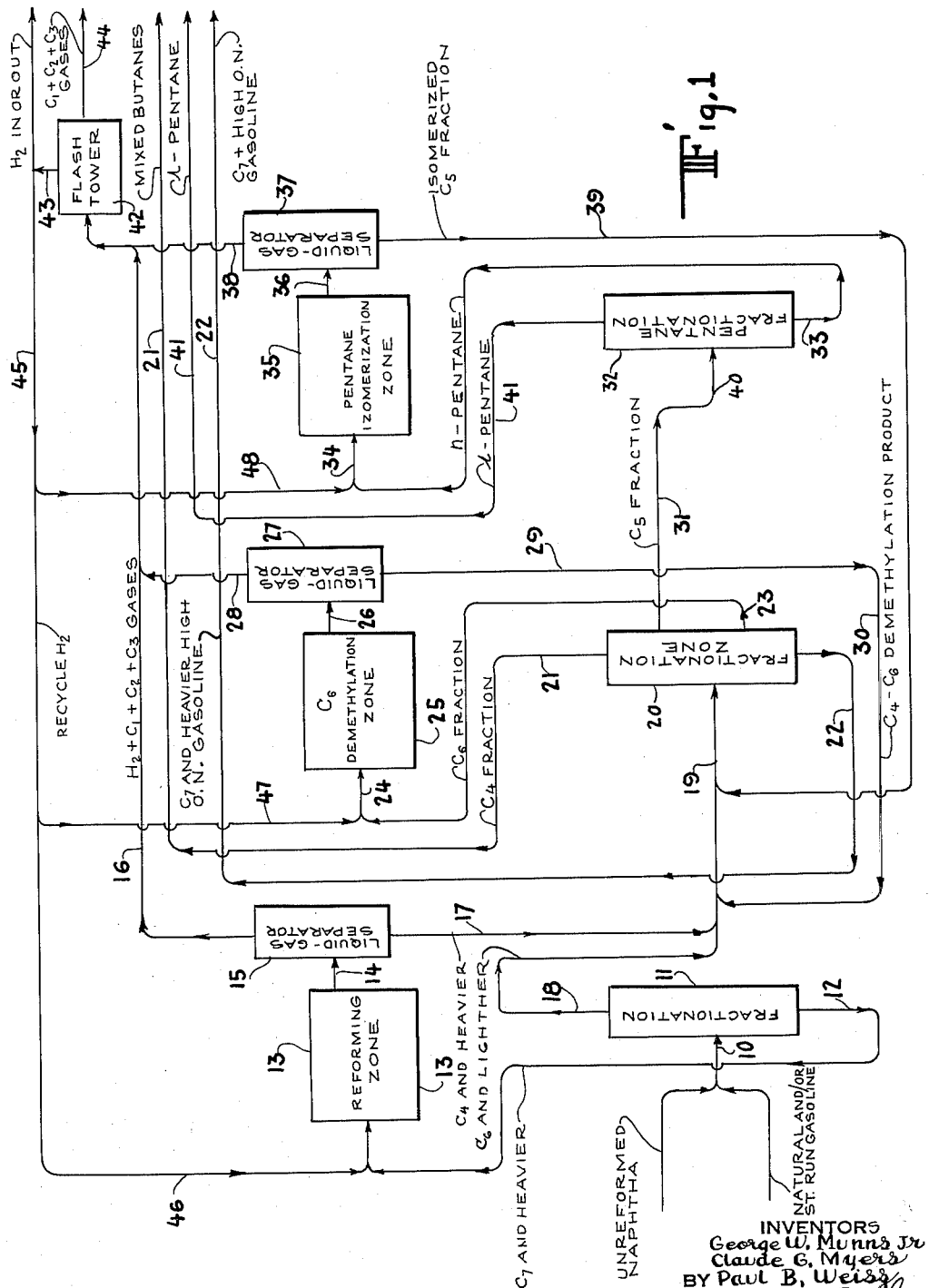
Figure 1 illustrates a process for upgrading $C_6$-containing petroleum hydrocarbon mixture utilizing a particular combination of reforming, demethylation and pentane isomerization.

Referring more particularly now to Figure 1, a hydrocarbon charge of unreformed naphtha, natural or straight run gasoline is conducted through line 10 to fractionator 11. $C_7$ and heavier hydrocarbons are removed as bottoms through line 12 and conducted to reforming zone 13 containing a reforming catalyst and maintained under reforming conditions in the presence of hydrogen. The reformer effluent passes through line 14 to a liquid-gas separator 15. Light gaseous products including hydrogen and $C_1$ to $C_3$ hydrocarbons are removed as overhead from the separator 15 through line 16. $C_4$ and heavier hydrocarbons are removed from separator 15 as bottoms through line 17. Such bottoms are combined with the overhead passing through line 18 from fractionator 11. The resulting combined stream is conducted through line 19 to a fractionation zone 20 wherein a $C_4$ fraction is removed as overhead through line 21. $C_7$ and heavier high octane number gasoline components are removed and conducted to storage through line 22. An intermediate fraction consisting essentially of $C_6$ hydrocarbons is withdrawn from fractionation zone 20 through line 23 and conducted through such line and line 24 to a demethylation zone 25 containing a suitable demethylation catalyst and maintained under demethylation conditions in the presence of hydrogen. The effluent from the demethylation zone is withdrawn through line 26, and conducted to a liquid-gas separator 27. Light gaseous products including hydrogen and $C_1$ to $C_3$ hydrocarbons are removed as overhead from separator 27 through line 28. The demethylation product is removed from separator 27 as bottoms through line 29 and recycled through lines 30 and 19 to fractionation zone 20 until principally a mixture of pentanes is obtained. The $C_5$ fraction is withdrawn from fractionation zone 20 through line 31 and conducted to a pentane fractionator 32. Normal pentane is withdrawn from fractionator 32 as bottoms through line 33 and conducted through such line and line 34 to pentane isomerization zone 35 containing a suitable isomerization catalyst and maintained under isomerization conditions in the presence of hydrogen. The effluent from isomerization is withdrawn through line 36 and conducted to liquid-gas separator 37. Light gaseous products including hydrogen and $C_1$ to $C_3$ hydrocarbons are removed from separator 37 as overhead through line 38. The isomerized $C_5$ fraction is withdrawn from separator 37 as bottoms through line 39 and recycled through such line and line 19 to the aforesaid fractionation zone 20. Iso-pentane is withdrawn as overhead from fractionator 32 through line 41. The light gaseous products resulting from reforming, demethylation and isomerization and passing through line 16 is conducted to a flash tower 42 wherein hydrogen is removed through line 43 while the light hydrocarbon gases are withdrawn through line 44. Apportioned streams of the withdrawn hydrogen are conducted through line 45 and through lines 46, 47 and 48 to the reforming zone, demethylation zone, and the isomerization zone respectively.

Figure 2:
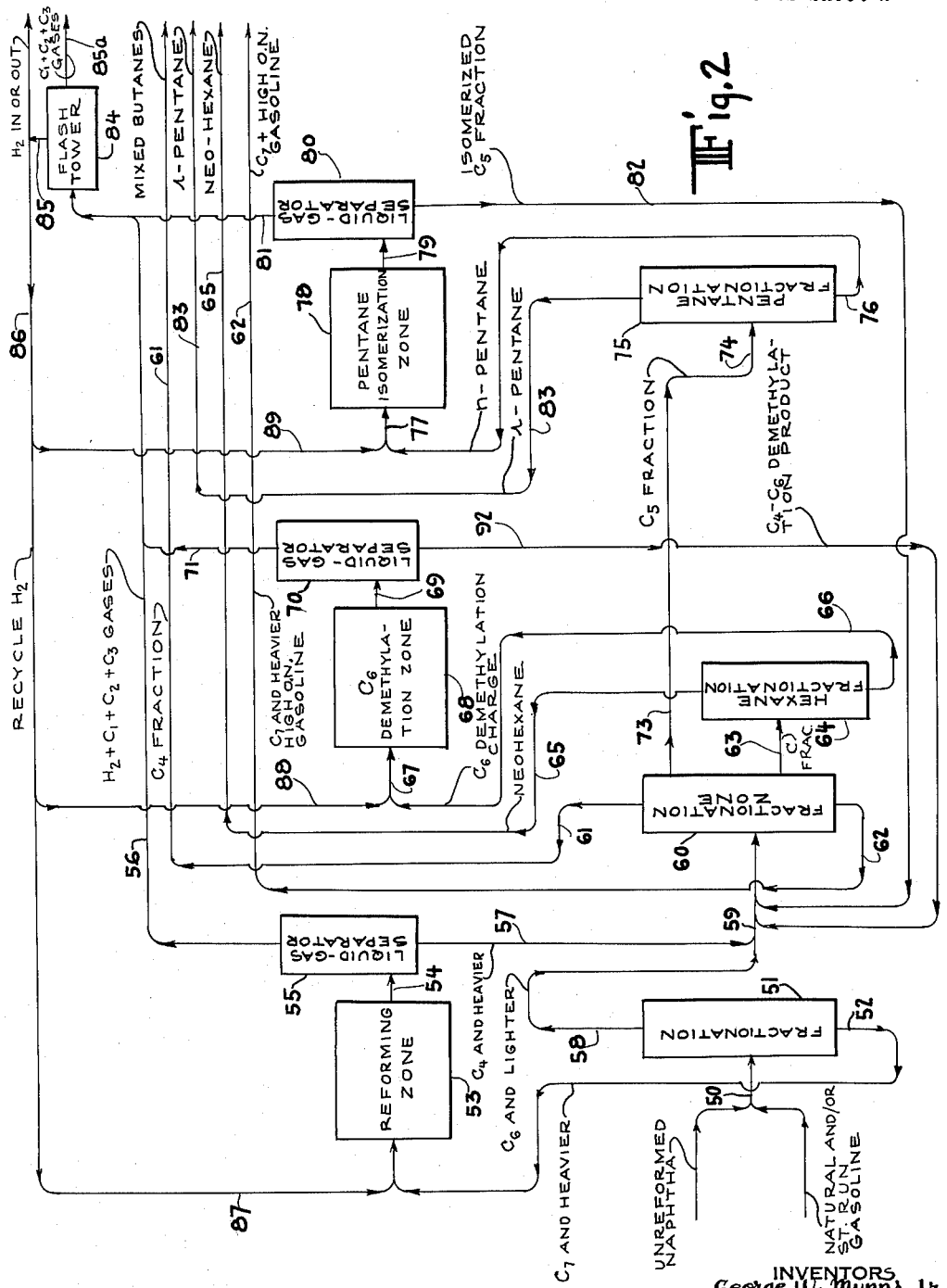
Figure 2 shows a process similar to that of Figure 1 but includes provision for the separate withdrawal of neo-hexane characterized by a high octane number.

Turning now to Figure 2, unreformed naphtha and natural or straight run gasoline is conducted through line 50 to fractionator 51. $C_7$ and heavier hydrocarbons are withdrawn as bottoms through line 52 and conducted to reforming zone 53 containing a suitable reforming catalyst and maintained under reforming conditions in the presence of hydrogen. The effluent from the reforming zone is conducted through line 54 to liquid-gas separator 55. Light gaseous products including hydrogen and $C_1$ to $C_3$ hydrocarbons are withdrawn as overhead from separator 55 through line 56. The $C_4$ and heavier hydrocarbons are withdrawn as bottoms from separator 55 through line 57. The overhead from fractionator 51 consisting of $C_6$ and lighter hydrocarbons is withdrawn through line 58 and combined with the bottoms from separator 55 in line 59. The so-combined streams are conducted to fractionation zone 60. A $C_4$ fraction is removed as overhead through line 61. A bottoms fraction consisting of $C_7$ and heavier octane number gasoline components is withdrawn as bottoms through line 62. An intermediate $C_6$ fraction is withdrawn from fractionation zone 60 through line 63 and conducted to hexane fractionator 64. Neohexane having a leaded blending octane number of 107 is removed as overhead from fractionator 64 through line 65. The remaining hexanes are withdrawn as bottoms from fractionator 64 through line 66 and conducted through such line and line 67 to demethylation zone 68 containing a suitable demethylation catalyst and maintained under demethylation conditions in the presence of hydrogen. The effluent from demethylation is removed through line 69 and conducted to liquid-gas separator 70. A light gaseous product including hydrogen and $C_1$ to $C_3$ hydrocarbons is withdrawn as overhead from separator 70 through line 71. The bottoms product from separator 70 passes through line 72 and is recycled through such line and line 59 to fractionation zone 60 to produce principally a mixture of pentanes. The $C_5$ fraction is withdrawn from fractionation zone 60 through line 73 and conducted through such line and line 74 to pentane fractionator 75. Normal pentane is removed as bottoms through line 76 and conducted through such line and line 77 to pentane isomerization zone 78 containing a suitable isomerization catalyst maintained under isomerization conditions in the presence of hydrogen. The effluent from isomerization is withdrawn through line 79 and conducted to liquid-gas separator 80. A light gaseous product including hydrogen and $C_1$ to $C_3$ hydrocarbons is withdrawn as overhead from separator 80 through line 81. The isomerized $C_5$ fraction is removed as bottoms from separator 80 and conducted through line 82 and recycled through line 59 to fractionation zone 60. Iso-pentane is removed as overhead from fractionator 75 through line 83. The light gaseous product including hydrogen and $C_1$ to $C_3$ hydrocarbon gases passing through line 56 is conducted to a flash tower 84. Hydrogen is separated and removed from such tower through line 85. The light hydrocarbon gases are removed from such tower through line 85a. An apportioned stream of the withdrawn hydrogen is conducted through line 86 and recycled through lines 87, 88, and 89 respectively, to the reforming, demethylation isomerization zones.

Figure 3:
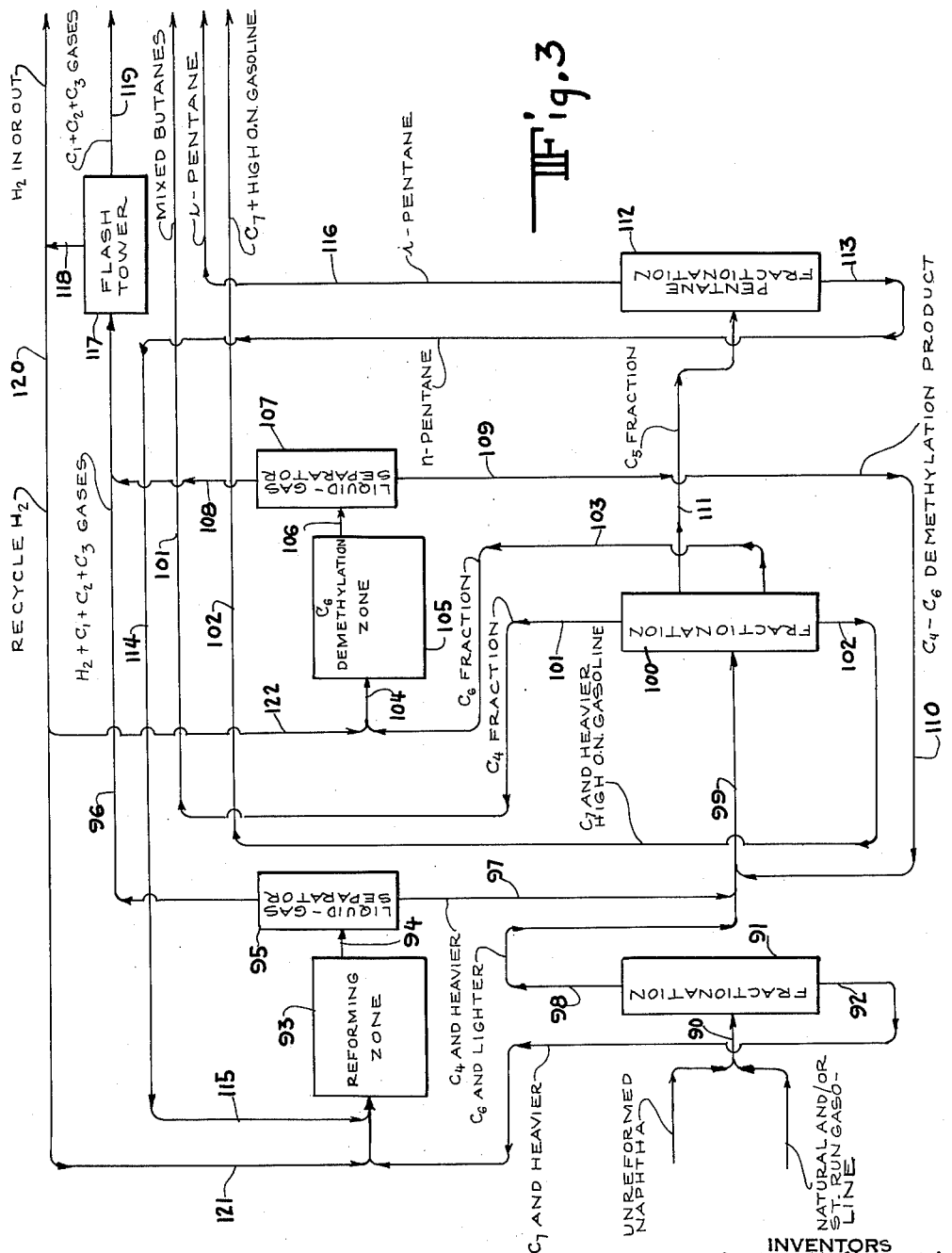
Figure 3 shows an alternate process wherein isomerization of normal pentane is accomplished in the reforming zone.

Referring now to Figure 3, unreformed naphtha and natural or straight run gasoline is conducted through line 90 to fractionator 91. $C_7$ and heavier hydrocarbons are withdrawn as bottoms through line 92 and conducted to reforming zone 93 containing a suitable reforming catalyst maintained under reforming conditions in the presence of hydrogen. The effluent from reformer 93 is withdrawn from line 94, and conducted through liquid-gas separator 95. A light gaseous product including hydrogen and $C_1$ to $C_3$ hydrocarbons is removed as overhead through line 96. A bottoms product consisting of $C_4$ and heavier hydrocarbons is removed through line 97. The overhead consisting of $C_6$ and lighter hydrocarbons from fractionator 91 is withdrawn through line 98 and combined with the bottoms from separator 95 in line 99. The combined stream is conducted to fractionator 100. A $C_4$ fraction is removed as overhead through line 101. A bottoms fraction consisting of $C_7$ and heavier high octane number gasoline components is withdrawn through line 102. An intermediate $C_6$ fraction is withdrawn through line 103 and conducted through such line and line 104 to demethylation zone 105 containing a suitable demethylation catalyst maintained under demethylation conditions in the presence of hydrogen. The effluent from demethylation is conducted through line 106 to liquid-gas separator 107 and the light gaseous product including hydrogen and $C_1$ to $C_3$ hydrocarbons is withdrawn through line 108. A bottoms product is withdrawn through line 109 and recycled through such line and line 110 and then through line 99 to fractionator 100 to produce principally a mixture of pentanes. The $C_5$ fraction is withdrawn from fractionator 100 through line 111 and conducted to pentane fractionator 112. Normal pentane is withdrawn as bottoms through line 113 and recycled through such line and lines 114 and 115 to reforming zone 93 to produce principally iso-pentane. Iso-pentane is removed as overhead from fractionator 112 through line 116. The light gaseous product including hydrogen and $C_1$ to $C_3$ hydrocarbons passing through line 96 is conducted to a flash tower 117. Hydrogen is separated and removed through line 118. The light hydrocarbon gases are removed through line 119. Apportioned streams of the separated hydrogen are conducted through line 120 and lines 121 and 122 to the reforming zone and demethylation zone respectively.

Figure 4:
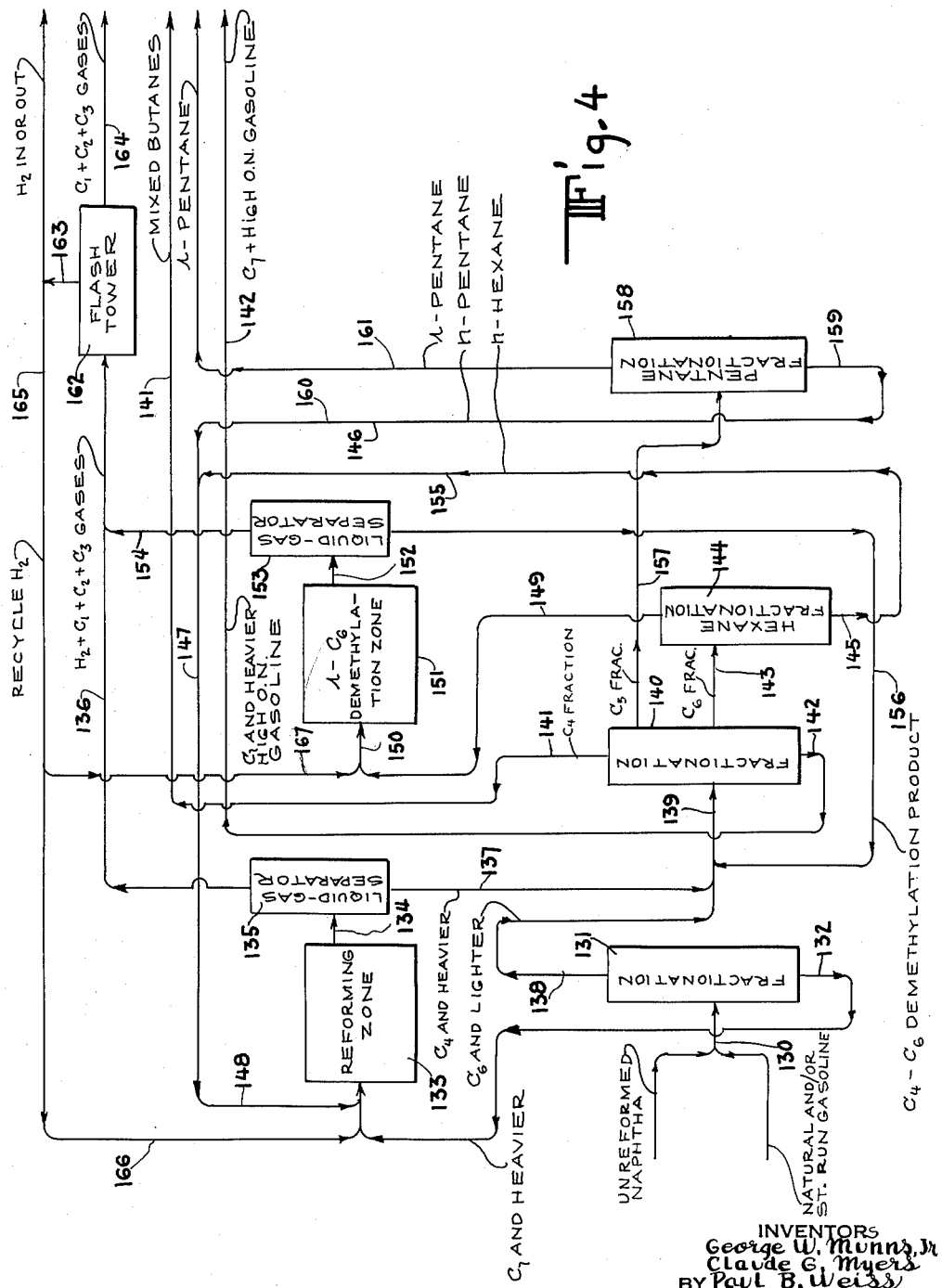
Figure 4 shows a process similar to Figure 3 but in which an intermediate separation of normal hexane from the other hexanes is effected.

Referring more particularly to Figure 4, unreformed naphtha and natural or straight run gasoline is conducted through line 130 to fractionator 131. $C_7$ and heavier hydrocarbons are removed as bottoms through line 132 and conducted to reforming zone 133 containing a suitable reforming catalyst and maintained under reforming conditions in the presence of hydrogen. The reformer effluent is removed through line 134 and conducted through liquid-gas separator 135. A light gaseous product including hydrogen and $C_1$ to $C_3$ hydrocarbons is removed as overhead through line 136. $C_4$ and heavier hydrocarbons are removed from separator 135 through line 137. The overhead from fractionator 131 consisting of $C_6$ and lighter hydrocarbons is withdrawn through line 138 and combined with the bottoms from separator 135 in line 139. The resulting combined stream is conducted to fractionator 140. A $C_4$ fraction is withdrawn as overhead through line 141. A bottoms fraction consisting essentially of $C_7$ and heavier high octane number gasoline components is withdrawn through line 142. An intermediate $C_6$ fraction is withdrawn through line 143 and conducted to hexane fractionator 144. Normal hexane is removed as bottoms through line 145 and recycled through lines 146, 147 and 148 to reforming zone 133 to produce principally iso-hexanes. The overhead from fractionator 144 consisting essentially of iso-hexanes is withdrawn through line 149 and conducted through such line and line 150 to demethylation zone 151 containing a suitable demethylation catalyst and maintained under demethylation conditions in the presence of hydrogen. The effluent from the demethylation zone is withdrawn through line 152 and conducted to liquid-gas separator 153. A light gaseous product including hydrogen and $C_1$ to $C_3$ hydrocarbons is removed as overhead through line 154. A bottoms product is removed from separator 153 through line 155 and recycled through such line and line 156 and then through line 139 to fractionator 140 to produce principally a mixture of pentane. The $C_5$ fraction is withdrawn through line 157 and conducted to pentane fractionator 158. Normal pentane is withdrawn through line 159 and recycled through such line and lines 160, 147 and 148 to reforming zone 133 to produce principally iso-pentane. The overhead from fractionator 158 consisting essentially of iso-pentane is withdrawn through line 161. The light gaseous products including hydrogen and $C_1$ to $C_3$ hydrocarbon gases passing through line 136 is conducted to a flash tower 162. Hydrogen is separated and withdrawn through line 163. The light hydrocarbon gases are withdrawn through line 164. Apportioned streams of hydrogen are conducted through line 165 and through lines 166 and 167 to the reforming zone and the demethylation zone respectively.

Figure 5:
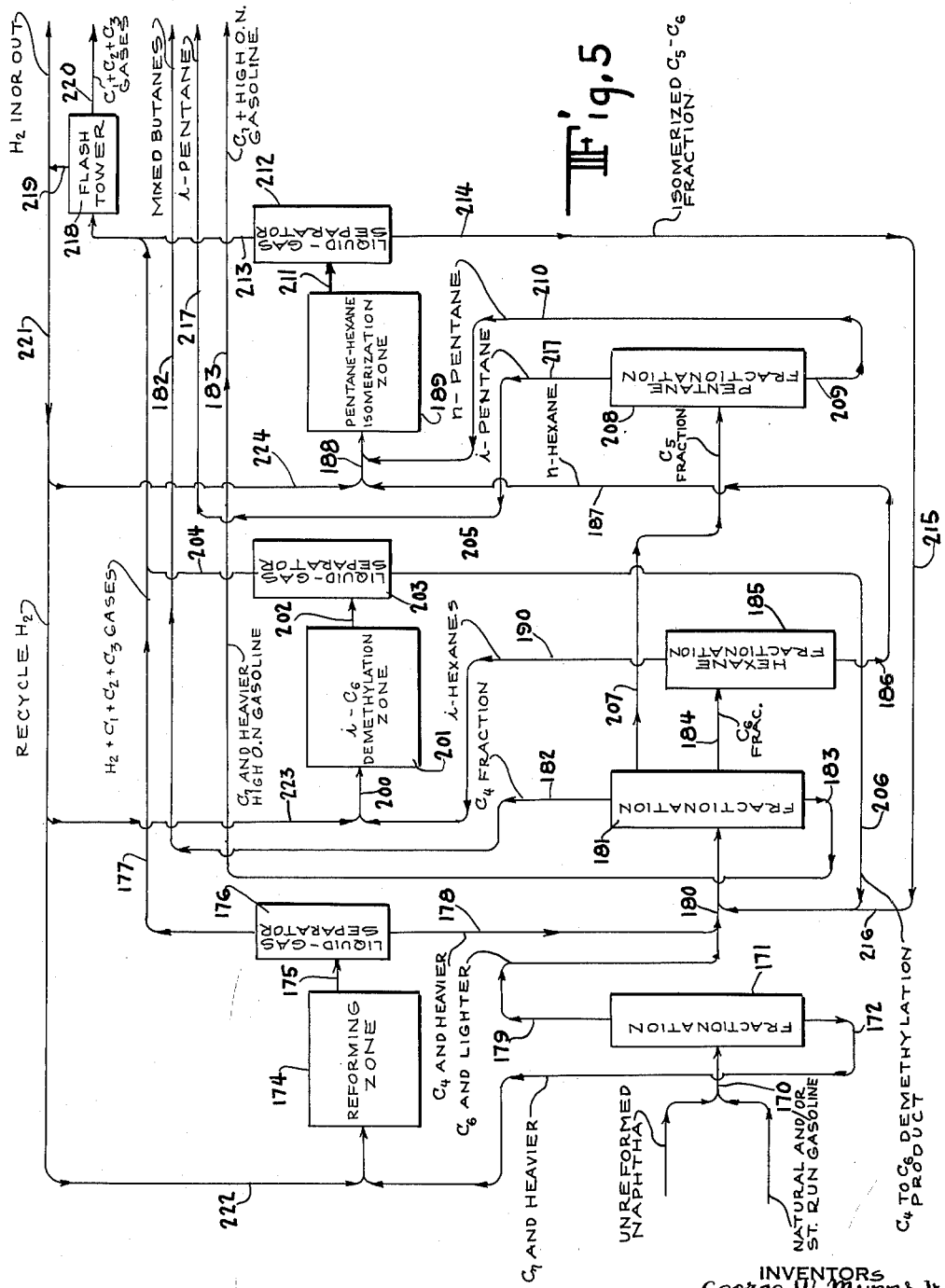
Figure 5 illustrates a process in which normal hexane is separated from other hexanes and subjected along with pentane to isomerization.

Referring more particularly now to Figure 5, unreformed naphtha and natural or straight run gasoline is conducted through line 170 to fractionator 171. $C_7$ and heavier hydrocarbons are withdrawn as bottoms through line 172 and conducted to reforming zone 174 containing a suitable reforming catalyst maintained under reforming conditions in the presence of hydrogen. The reformer effluent is withdrawn through line 175 and conducted to liquid-gas separator 176. A light gaseous product including hydrogen and $C_1$ to $C_3$ hydrocarbons is removed as overhead through line 177. A bottoms product consisting of $C_4$ and heavier hydrocarbons is removed through line 178. The overhead from fractionator 171 consisting of $C_6$ and lighter hydrocarbons is withdrawn through line 179 and combined with the bottoms product from fractionator 176 in line 180. The resulting combined stream is conducted to fractionator 181. A $C_4$ overhead fraction is withdrawn through line 182. A bottoms fraction consisting essentially of $C_7$ and heavier high octane number gasoline components is withdrawn through line 183. An intermediate $C_6$ fraction is withdrawn through line 184 and conducted to hexane fractionator 185. Normal hexane is removed as bottoms through line 186 and conducted through such line and lines 187, and 188 to isomerization zone 189 containing a suitable isomerization catalyst and maintained under isomerization conditions in the presence of hydrogen. An overhead from fractionator 185 consisting essentially of iso-hexanes is withdrawn from line 190 and conducted from such line and line 200 to demethylation zone 201 containing a suitable demethylation catalyst and maintained under demethylation conditions in the presence of hydrogen. The effluent from demethylation is withdrawn through line 202 to liquid-gas separator 203. A light gaseous product including hydrogen and $C_1$ to $C_3$ hydrocarbons is removed as overhead through line 204. A bottoms product is removed through line 205 and conducted through such line and line 206 and then through line 180 to fractionator 181 to produce principally a mixture of pentanes. A $C_5$ fraction is withdrawn from fractionator 181 through line 207 and conducted to pentane fractionator 208. Normal pentane is withdrawn as bottoms through line 209 and conducted through such line and lines 210 and 188 to isomerization zone 189. The effluent from isomerization is withdrawn through line 211 and conducted to liquid-gas separator 212. A light gaseous product including hydrogen and $C_1$ to $C_3$ hydrocarbons is removed as overhead through line 213. Isomerized $C_5$–$C_6$ fraction is removed as bottoms through line 214 and conducted through such line and lines 215 and 216 and then through line 180 to fractionator 181. Isopentane is removed as overhead from fractionator 208 through line 217. The gaseous product including hydrogen and $C_1$ to $C_3$ hydrocarbons passing through line 177 is conducted to a flash tower 218. Hydrogen is separated and withdrawn through line 219. The light hydrocarbon gases are withdrawn through line 220. Withdrawn hydrogen is conducted through line 221 and apportioned streams are recycled through lines 222, 223, and 224 to the reforming zone, the demethylation zone and the isomerization zone respectively.

Figure 6:
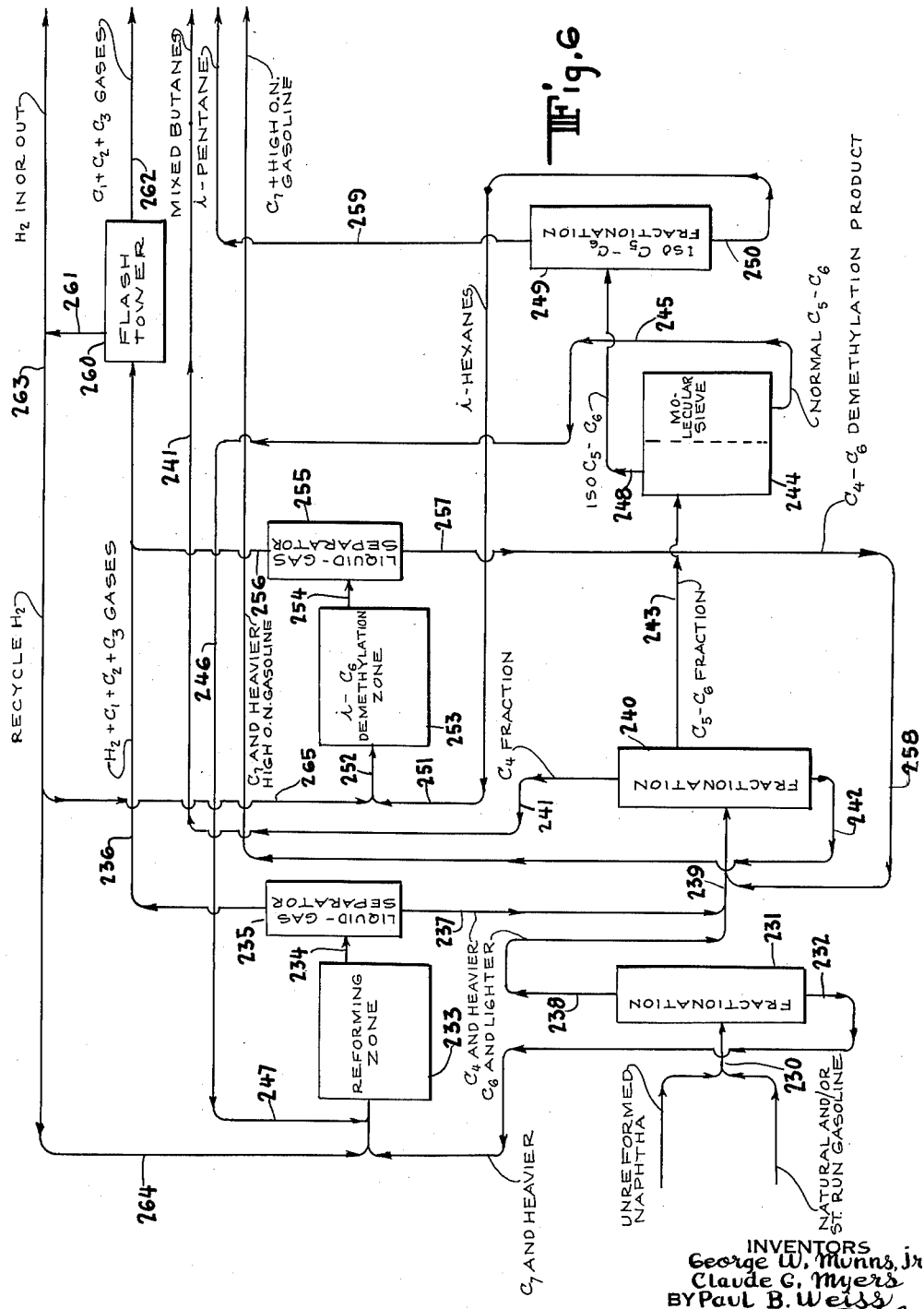
Figure 6 shows a process in which the $C_5$ to $C_6$ fraction of the reformer effluent is separated into normal and iso-components utilizing a crystalline molecule sieve zeolite. The normal components are recycled to the reforming zone.

Turning now to Figure 6, unreformed naphtha or natural or straight run gasoline was conducted through line 230 to fractionator 231. A bottoms product consisting essentially of $C_7$ and heavier hydrocarbons is removed through line 232 and conducted to reforming zone 233 containing a suitable reforming catalyst and maintained under reforming conditions in the presence of hydrogen. The reformer effluent is removed through line 234 and conducted to liquid-gas separator 235. A light gaseous product including hydrogen and $C_1$ to $C_3$ hydrocarbons is removed as overhead through line 236. A bottoms product consisting essentially of $C_4$ and heavier hydrocarbons is removed through line 237. An overhead product from fractionator 231 consisting essentially of $C_6$ and lighter hydrocarbons is removed through line 238 and combined with the bottoms from separator 235 in line 239. The resulting combined streams are conducted to fractionator 240. A $C_4$ fraction is removed as overhead through line 241. A bottoms fraction consisting essentially of $C_7$ and heavier high octane number gasoline components is removed through line 242. An intermediate $C_5$–$C_6$ fraction containing iso and normal components is removed through line 243 and conducted to separator 244 containing a quantity of crystalline molecular sieve zeolites having a uniform pore structure sufficiently small to exclude the iso $C_5$ and $C_6$ components but sufficiently large to permit passage of the normal $C_5$ and $C_6$ components. The normal $C_5$–$C_6$ components so separated are conducted through lines 245, 246 and 247 to reforming zone 233 wherein they undergo isomerization to the respective iso compounds. The iso $C_5$–$C_6$ components are removed from separator 244 through line 248 and conducted to fractionator 249. Iso-hexanes are removed as bottoms through line 250 and conducted through such line and lines 251 and 252 to demethylation zone 253 containing a suitable demethylation catalyst maintained under demethylation conditions in the presence of hydrogen. The effluent from the demethylation zone is conducted through line 254 to liquid-gas separator 255. A light gaseous product including hydrogen and $C_1$ to $C_3$ hydrocarbons is removed as overhead through line 256. A bottoms product is removed through line 257 and conducted through such line and line 258 and then through line 239 to fractionator 240. Iso-pentane is removed as overhead from fractionator 249 through line 259. The light gaseous product including hydrogen and $C_1$ to $C_3$ hydrocarbon gases passing through line 236 is conducted to a flash tower 260. Hydrogen is separated and withdrawn through line 261. The light hydrocarbon gases are separated and withdrawn through line 262. Withdrawn hydrogen is conducted through line 263 and recycled through lines 264 and 265 to the reforming zone and the demethylation zone respectively.

Figure 7:
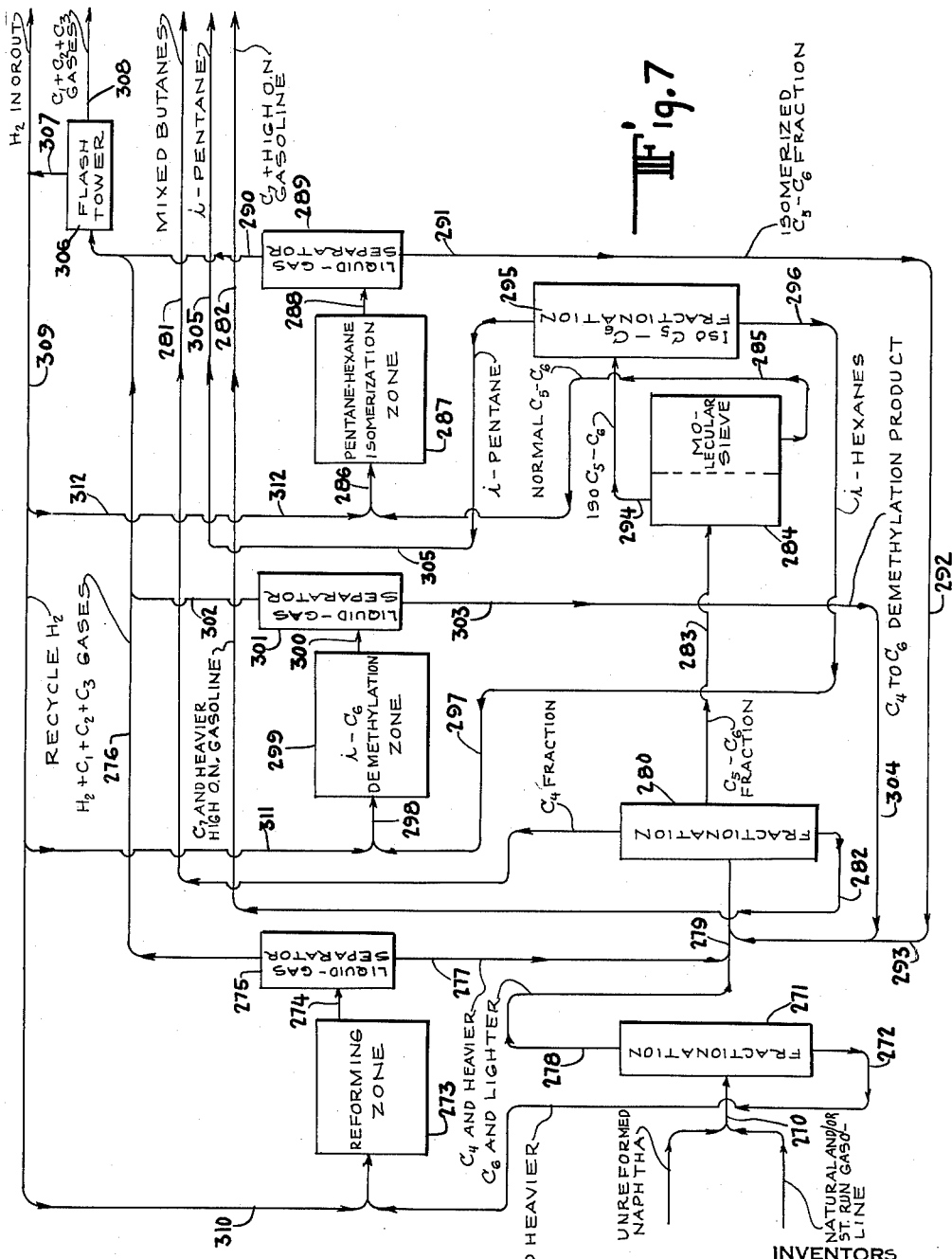
Figure 7 illustrates a process similar to Figure 6 but in which the separated normal $C_5$ to $C_6$ components are conducted to a separate isomerization zone.

Referring now more particularly to Figure 7, unreformed naphtha or natural or straight run gasoline is conducted through line 270 to fractionator 271. $C_7$ and heavier hydrocarbons are withdrawn as bottoms through line 272 and conducted to reforming zone 273 containing a suitable reforming catalyst and maintained under reforming conditions in the presence of hydrogen. The reformer effluent is withdrawn through line 274 and conducted to liquid-gas separator 275. A light gaseous product including hydrogen and $C_1$ to $C_3$ hydrocarbons is removed as overhead through line 276. A bottoms product consisting essentially of $C_4$ and heavier hydrocarbons is withdrawn through line 277. The overhead from fractionator 271 consisting essentially of $C_6$ and lighter hydrocarbons is withdrawn through line 278 and combined with the bottoms from separator 275 in line 279. The resulting combined stream is conducted to fractionator 280. A $C_4$ fraction is removed as overhead through line 281. A bottoms product consisting essentially of $C_7$ and heavier high octane number gasoline components is withdrawn through line 282. An intermediate fraction consisting of normal and iso $C_5$ and $C_6$ hydrocarbons is withdrawn through line 283 and conducted to separator 284 containing a quantity of crystalline molecular sieve zeolites having a uniform pore structure sufficiently small to exclude the iso $C_5$ and $C_6$ components but sufficiently large to permit passage of the normal $C_5$ and $C_6$ components. The separated normal $C_5$ and $C_6$ components are conducted through lines 285 and 286 to isomerization zone 287 containing a suitable isomerization catalyst and maintained under isomerization conditions in the presence of hydrogen. The effluent from isomerization is conducted through line 288 to liquid-gas separator 289. A light gaseous product including hydrogen and $C_1$ to $C_3$ hydrocarbons is removed as overhead through line 290. A bottoms product is removed through line 291 and conducted through such line and lines 292 and 293 and then through line 279 to fractionator 280. The iso $C_5$–$C_6$ fraction passing from separator 284 is conducted through line 294 to fractionator 295. A bottoms product consisting of iso-hexanes is withdrawn through line 296 and conducted through such line and lines 297 and 298 to demethylation zone 299. The effluent from demethylation is conducted through line 300 to liquid-gas separator 301. A light gaseous product including hydrogen and $C_1$ to $C_3$ hydrocarbons is removed as overhead through line 302. A bottoms product is removed through line 303 and conducted through such line and line 304 and then through line 279 to fractionator 280. Iso-pentane is removed from fractionator 295 as overhead through line 305. The light gaseous product including hydrogen and $C_1$ to $C_3$ hydrocarbons passing through line 276 is conducted to a flash tower 306. Hydrogen is separated and withdrawn through line 307. Light hydrocarbon gases are withdrawn through line 308. Withdrawn hydrogen is conducted through line 309 and apportioned streams are recycled through lines 310, 311 and 312 to the reforming zone, the demethylation zone and the isomerization zone respectively.

Figure 8:
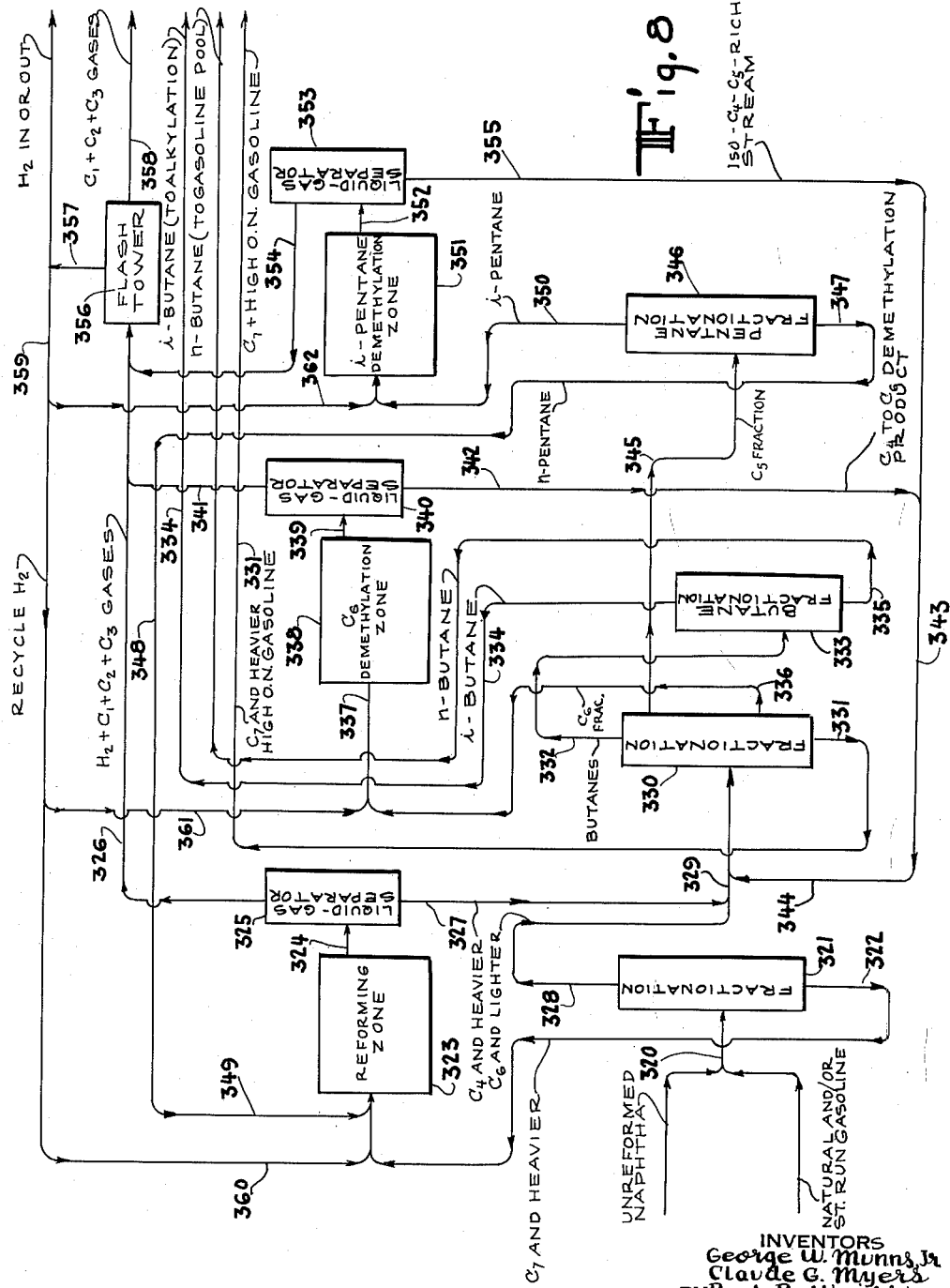
Figure 8 illustrates a process for the production of iso-butane including the steps of reforming, a $C_6$ demethylation, an isomerization conducted in the reforming zone and an iso-pentane demethylation.

Turning now to Figure 8, unreformed naphtha or natural gasoline or straight run gasoline is conducted through line 320 to fractionator 321. A bottoms product consisting essentially of $C_7$ and heavier hydrocarbons is withdrawn through line 322 and conducted to reforming zone 323, containing a suitable reforming catalyst and maintained under reforming conditions in the presence of hydrogen. The reformer effluent is removed through line 324 and conducted to a liquid-gas separator 325. A light gaseous product consisting essentially of hydrogen and $C_1$ to $C_3$ hydrocarbons is removed as overhead through line 326. A bottoms product consisting essentially of $C_4$ and heavier hydrocarbons is withdrawn through line 327. Overhead from fractionator 321 consisting essentially of $C_6$ and lighter hydrocarbons is withdrawn through line 328 and combined with the bottoms product from separator 325 in line 329. The resulting combined stream is conducted to fractionator 330. A bottoms product consisting essentially of $C_7$ and heavier high octane number gasoline components is withdrawn through line 331. A $C_4$ fraction consisting of butanes is removed as overhead through line 332 and conducted to a butane fractionator 333. Iso-butane is removed as overhead through line 334 and normal butane is removed as bottoms through line 335. An intermediate $C_6$ fraction is removed from fractionator 330 through line 336 and conducted through such line and line 337 to demethylation zone 338 containing a suitable demethylation catalyst maintained under demethylation conditions in the presence of hydrogen. The effluent from demethylation is withdrawn through line 339 and conducted to liquid-gas separator 340. A light gaseous product including hydrogen and $C_1$ to $C_3$ hydrocarbons is removed as overhead through line 341. The bottoms product is withdrawn through line 342 and recycled through lines 343 and 344 and then through line 329 to fractionator 330, to produce principally a mixture of pentanes. The $C_5$ fraction is withdrawn through fractionator 330 through line 345 and conducted to pentane fractionator 346. Normal pentane is withdrawn as a bottoms product through line 347 and recycled through lines 348 and 349 to reforming zone 323 to produce principally iso-pentanes. An iso-pentane fraction is withdrawn as overhead from fractionator 346 through line 350 and conducted to demethylation zone 351 containing a suitable demethylation catalyst and maintained under demethylation conditions in the presence of hydrogen. The effluent from the demethylation zone is withdrawn through line 352 and conducted to liquid-gas separator 353. A light gaseous product including hydrogen and $C_1$ to $C_3$ hydrocarbons is withdrawn through line 354. A bottoms product is withdrawn through line 355 and recycled through lines 343 and 344 and then through line 329 to fractionator 330. The light gaseous product including the hydrogen and $C_1$ to $C_3$ hydrocarbons passing through line 326 is conducted to a flash tower 356. Hydrogen is separated and withdrawn through line 357. Light hydrocarbon gases are withdrawn through line 358. Withdrawn hydrogen is conducted through line 359 and recycled through line 360 to reforming zone 323 through line 361 to demethylation zone 338 and through line 362 to demethylation zone 351.

While in the above descriptions of Figures 1 to 8 separation of normal pentane (boiling point of 37° C.) and iso-pentane (boiling point of 28° C.) has been shown to be effected by fractionation, it is also within the scope of this invention to effect separation of these isomers by contacting with certain crystalline zeolites characterized by uniform pore structure and known in the art as molecular sieves. Thus, it is possible to effect separation of normal pentane and iso-pentane by contacting the mixture thereof with a crystalline molecular sieve zeolite characterized by a uniform pore structure made up of pores approximately 5 Angstroms in diameter. Such a crystalline zeolite is commercially available, being known in the trade as "molecular sieve 5 A." Likewise, in the embodiments depicted in Figures 4 and 5, normal hexane (boiling point of 69° C.) can be separated from the other hexanes (boiling point of 63° C. or less) either by fractionation or by contacting with a molecular sieve zeolite such as the aforementioned molecular sieve 5 A., which will adsorb normal hexane only from a mixture of all the $C_6$ paraffins, naphthenes and aromatics. The use of molecular sieve zeolites affords a significant process simplification whenever both hexanes and pentanes are desirably separated into normal components and their isomers as in the embodiments shown in Figures 6 and 7. In accordance with such embodiments, the mixed hexanes and pentanes are taken as a single stream and separated with a molecular sieve having a uniform structure made up of pores sufficiently small to exclude the iso components but sufficiently large to permit passage of the normal components. In such manner, the mixed hexanes and pentanes can be separated into a mixture of normal hexane and normal pentane on the one hand, and a mixture of iso-hexane and iso-pentane on the other hand. Subsequent distillation of isopentane (boiling point of 28° C.) from iso-hexanes (boiling point of 50° C. or more) and subsequent distillation of normal pentane (boiling point of 37° C.) from normal hexane (boiling point of 69° C.) is much more easily carried out than the otherwise required distillations of iso-pentane from normal pentane and of iso-hexanes (boiling point of 63° C. or less) from normal hexane.

In the embodiments shown in Figures 3, 4, and 6, since there is no separate isomerization reactor as such, both the normal pentane and normal hexane are isomerized in the reforming zone. Each is recycled to extinction producing mainly isopentanes and iso-hexanes. Only iso-hexanes are demethylated producing iso-pentane rich $C_5$ fraction along with some iso-butane rich $C_4$ fraction. Likewise, in the embodiment shown in Figure 8, the reformer is used to isomerize the normal pentane produced by demethylation of the $C_6$ hydrocarbons, the normal pentane being recycled to extinction. The iso-pentane thus produced is then demethylated being mainly recycled to produce principally iso-butane.

The following example will serve to illustrate the process of this invention without limiting the same:

A. *Reforming step.*—Mid-Continent naphtha (180° F.–360° F. boiling range) containing 3.8 volume percent of hexanes and 0.3 volume percent of benzene was reformed in the presence of a reforming catalyst consisting essentially of 0.6 percent by weight of platinum on alumina. Reforming was carried out at a temperature of 945° F., a pressure of 500 p.s.i.g., employing a 10 molar ratio of hydrogen to naphtha and a liquid hourly space velocity of 1. The material employed in demethylation step B below was taken from the reformer after 120 days on stream, when 84.6 volume percent of 97.7-octane number debutanized gasoline was being produced. The resulting gasoline product contained approximately 7.5 volume percent of hexanes and 3.0 volume percent of benzene. A $C_6$ cut (120–160° F. boiling range) was distilled from a 97.8 octane-number gasoline pool made by several such reforming runs. The $C_6$ cut amounted to 8.6 volume percent of the gasoline and thus to 7.3 volume percent yield based on the reformer charge. It contained 79 volume percent of hexanes, 7 volume percent of $C_6$ naphthenes, 8 volume percent of benzene, and 6 volume percent of pentanes. The octane number of this $C_6$ cut was 89.8 in accordance with the research method (F—1+3 cc. TEL.)

B. *Demethylation step.*—Two runs were made in which the above-described 120–160° F. $C_6$ cut was demethylated primarily into a mixture of pentanes and methane.

In the first run a demethylation catalyst of 45.5 weight percent of nickel on kieselguhr was used. At an average temperature of 528° F., a pressure of 500 pounds per square inch gauge, a liquid hourly space velocity of 2 and employing a 10 molar ratio of hydrogen to hydrocarbon, a product was obtained which contained 64.6 weight percent (based on charge) of hexanes, 16.3 weight percent of $C_6$ naphthenes, 8.6 weight percent of iso-pentane, 6.6 weight percent of normal pentane, and 2.2 weight percent of $C_4$ hydrocarbons. From these results, recycling of $C_6$ hydrocarbons to extinction would give ultimate yields (based on demethylation charge) of 46 volume percent of iso-pentane, 35 volume percent of normal pentane and 13 volume percent of butanes.

In the second run, the catalyst employed was one volume of a reforming catalyst consisting essentially of 0.6 percent by weight of platinum on alumina placed ahead of 2 volumes of a catalyst of 45.5 weight percent of nickel on kieselguhr. At an average temperature in the nickel-kieselguhr bed of 536° F. and at a pressure of 500 p.s.i.g., a liquid hourly space velocity of 2 (based on volume of nickel catalyst), and a 10 molar ratio of hydrogen to hydrocarbon, the product obtained contained 67.8 weight percent (based on charge) of hexanes, 10.8 weight percent of $C_6$ naphthenes, 9.7 weight percent of iso-pentane, 9.0 weight percent of normal pentane and 1.7 weight percent of butanes. Recycling of $C_6$ hydrocarbons to extinction would give ultimate yields of 49 volume percent of iso-pentane, 45 volume percent of normal pentane, and 9 volume percent of butanes based on the demethylation charge.

These runs show that demethylation of the 90-octane number $C_6$ cut from the reformate yielded generally from 46 to 49 volume percent (based on charge) of 102-octane number iso-pentane, from 13–9 volume percent of 103-octane number mixed butanes, and from 35–45 volume percent of 84-octane number normal pentane which can be isomerized to iso-pentane. Isomerization of normal pentane was accomplished as follows:

C. *Isomerization step.*—Normal pentane was isomerized over an isomerization catalyst consisting essentially of 0.4 weight percent of platinum deposited on a silica-alumina composite containing about 25 percent by weight alumina and 75 percent by weight of silica. At a temperature of 803° F., a pressure of 500 p.s.i.g., and a liquid hourly space velocity of 2 and employing a molar ratio of hydrogen to pentane of 10, the product obtained contained 52.8 weight percent (based on charge) of iso-pentane, 42.3 weight percent of normal pentane and 0.8 weight percent of mixed butanes. Recycling of normal pentane to extinction would produce 92 volume percent (based on charge) of iso-pentane, and 1.5 volume percent of mixed butanes.

The combination of the demethylation step with the pentane isomerization step thus yielded 78–91 volumes of 102-octane number iso-pentane plus 14–9 volumes of 103-octane number of mixed butanes from 100 volumes of the 90-octane number $C_6$ cut from the reformate. The combination of naphtha reforming, demethylation of a $C_6$ cut of the resulting reformate and pentane isomerization accordingly had the effect of replacing 7.3 volume percent (based on reformer charge) of 90-octane number $C_6$'s in the reformate by an essentially equal volume of at least 102-octane number mixture of 91 volume percent of iso-pentane and 9 volume percent of mixed butanes.

Hydrocarbon stocks suitable for use as charge in the process of this invention comprise petroleum distillates or fractions thereof boiling within the approximate range of 60° F. to 450° F. Selected fractions from such stocks may advantageously be prepared for particular portions of the processing operation. Thus, naphthas having initial boiling points in the range from about 150° F. to about 250° F. and end points in the range from about 350° F. to 425° F. are particularly preferred stocks for charging to the reforming step. Light naphthas having initial boiling points in the approximate range of 110 to 120° F. and end points in the approximate range of 180° F. to 200° F. and containing a major proportion of aliphatic hydrocarbons are particularly preferred charge stocks for the demethylation step. These charge stocks may be derived from reformer effluents, virgin naphthas or natural gasolines.

It is contemplated that in the reforming, demethylation and isomerization steps in the process described herein the conditions for effecting such reactions and the catalyst used may be any of those heretofore employed. Thus, representative reforming catalysts which may be used include platinum or palladium on alumina containing combined halogen, platinum or palladium on silica-alumina, molybdena-alumina composites, chromia-alumina composites, and cobalt molybdate deposited on suitable supports such as alumina. Suitable demethylation catalysts include supported nickel or cobalt composites either used alone or with a pretreating layer of a platinum metal catalyst in accordance with the process described in application Serial Number 715,448, filed February 14, 1958. Isomerization may be effected in the vapor phase over platinum or palladium on silica-alumina or alumina-containing combined halogen. Isomerization in the liquid phase is suitably accomplished over a catalyst of aluminum chloride complexed with either antimony chloride or hydrocarbons. Aluminum chloride type isomerization desirably uses hydrogen or aromatics such as benzene or alicyclics such as cyclohexane to suppress pentane decomposition.

As hereinabove noted, the conditions for carrying out the various conversion reactions involved in the present process are those which have heretofore been found desirable in the art. The particular conditions employed in effecting the desired reforming, demethylation or isomerization will depend in part on the nature of the particular catalyst employed. In reforming, the temperature is in the approximate range of 700° to 1100° F., the pressure is in the range of 0 to 3000 p.s.i.g., the hydrogen to hydrocarbon mole ratio is in the approximate range of 0.5 to 10 and the liquid hourly space velocity employed is generally between about 0.2 and about 10. For reforming in the presence of a platinum metal catalyst, the temperature is generally between about 700 and about 1050° F. and preferably between about 800 and 1000° F.; the pressure is generally between 0 and 3000 p.s.i.g. and preferably between about 100 and about 600 p.s.i.g.; the hydrogen to hydrocarbon mole ratio is generally between about 0.5 and about 40 and preferably between about 4 and about 10; the liquid hourly space velocity is generally between about 0.5 and about 10 and preferably between about 0.5 and about 5. Utilizing a chromia-alumina or a molybdena-alumina reforming catalyst, the temperature is generally between about 800 and about 1100° F. and preferably between about 800 and about 1050° F.; the pressure is generally between about 0 and about 500 p.s.i.g. and preferably between about 15 and about 400 p.s.i.g.; the hydrogen to hydrocarbon mole ratio is generally between about 0.5 and about 10 and preferably between about 3 and about 7 and the liquid hourly space velocity is generally between about 0.2 and about 10 and preferably between about 0.5 and about 1.

In effecting demethylation utilizing a supported nickel or cobalt catalyst, the temperature is generally between about 350 and about 700° F. and preferably between about 500 and about 650° F.; the pressure is generally between about 0 and about 3000 p.s.i.g. and preferably between about 100 and about 1000 p.s.i.g.; the hydrogen to hydrocarbon mole ratio is generally between about 1.5 and about 40 and preferably between about 2 and about 10 and the liquid hourly space velocity is usually between about 0.5 and about 10.

The conditions used for effecting pentane or hexane isomerization may vary within a temperature range of about 175 to about 1000° F.; a pressure within the approximate range of 0 to 1000 p.s.i.g., a hydrogen to hydrocarbon mole ratio within the approximate range of 0.1 to 40 and a liquid hourly space velocity within the approximate range of 0.5 to 40. Within this broad range, isomerization conditions will be used depending on the nature of the particular catalyst employed. Thus, utilizing a platinum metal isomerization catalyst, the temperature generally is between about 600 and about 1000° F. and preferably between about 700 and about 900° F.; the pressure is generally between about 0 and about 1000 p.s.i.g. and preferably between about 100 and about 500 p.s.i.g.; the hydrogen to hydrocarbon mole ratio is generally between about 0.1 and about 40 and preferably between about 0.5 and about 10 and the liquid hourly space velocity is generally between about 0.5 and about 40 and preferably between about 0.5 and about 5. Utilizing a molybdena-containing isomerization catalyst, the temperature is generally between about 700 and about 1000° F. and preferably between about 815 and about 860° F.; the pressure is generally between about 100 and about 1000 p.s.i.g. and preferably between about 250 and about 500 p.si.g.; the hydrogen to hydrocarbon mole ratio is generally between about 0.5 and about 2.5 and preferably between about 0.8 and about 1.6 and the liquid hourly space velocity is generally between about 0.1 and about 10 and preferably between about 0.3 and about 0.8. Utilizing aluminum chloride type isomerization catalysts, the temperature employed with a aluminum chloride-antimony trichloride complex catalyst is generally between about 176 and about 212° F.; the pressure is generally about 300 p.s.i.g., the concentration of hydrogen chloride is about 5 percent by weight and the liquid hourly space velocity employed is about 2.5. Utilizing a catalyst of aluminum chloride-naphtha complex the temperature is generally within the approximate range of 180 to 210° F., the pressure is about 300 p.s.i.g., the inhibitor present is generally about 0.5 percent by weight of benzene or 0.5 to 1.5 percent by weight of cyclohexane and the concentration of hydrogen chloride is generally about 5 percent by weight and the liquid hourly space velocity employed is about 1.

It is evident that for the foregoing reactions, the variables are interrelated and that temperature of operation is generally fixed as a result of primary choices with respect to other variables and the desired conversion level. With reference to reforming and isomerization operations the interrelationships of the variables are well known to those skilled in the art. With reference to demethylation it has heretofore been known that temperature, total pressure and hydrogen partial pressure should be selected on the basis of a direct proportionality between temperature and logarithm of pressure if selective demethylation is to be achieved. That is, the higher temperatures require the higher pressures in order to effect substantially only loss of methyl groups from the paraffin chains.

It is to be understood that the above description is merely illustrative of preferred embodiments of the invention of which many variations may be made within the scope

We claim:

1. A method for improving the quality, octane numberwise, of a $C_6$-containing petroleum hydrocarbon mixture which comprises subjecting the same to reforming in the presence of hydrogen under catalytic reforming conditions of temperature and pressure; separating the resulting reformer effluent into (1) light gaseous products including hydrogen and $C_1$ to $C_3$ hydrocarbons and (2) $C_4$ and heavier liquid products; conducting the latter to a fractionation zone, removing and collecting a $C_4$ fraction, characterized by a high octane number, as overhead, removing and collecting $C_7$ and heavier hydrocarbons as bottoms and removing an intermediate fraction consisting essentially of $C_6$ hydrocarbons; subjecting said intermediate fraction to demethylation in the presence of hydrogen under catalytic demethylation conditions of temperature and pressure; separating the demethylation effluent into light gaseous products including hydrogen and $C_1$ to $C_3$ hydrocarbons and recycling the remaining liquid demethylated product to said fractionation zone to extinction to produce principally a mixture of pentanes; separating the resulting pentane mixture into isopentane and normal pentane; subjecting the latter to isomerization in the presence of hydrogen under catalytic isomerization conditions of temperature and pressure; separating the isomerization effluent into light gaseous products including hydrogen and $C_1$ to $C_3$ hydrocarbons and recycling the remaining isomerized product to said fractionation zone; combining the light gaseous products resulting from the aforementioned reforming, demethylation, and isomerization steps; separating hydrogen from said combined products and recycling apportioned streams of said separated hydrogen to said reforming, demethylation and isomerization operations.

2. A method for upgrading a petroleum hydrocarbon mixture boiling within the approximate range of 60° F. to 450° F. which comprises subjecting the same to fractionation under conditions such that $C_6$ and lighter hydrocarbons are obtained as overhead and $C_7$ and heavier hydrocarbons are obtained as bottoms, reforming said bottoms in the presence of hydrogen under catalytic reforming conditions of temperature and pressure; separating the resulting reformer effluent into (1) light gaseous products including hydrogen and $C_1$ to $C_3$ hydrocarbons and (2) $C_4$ and heavier liquid products, combining the latter with the aforesaid overhead; conducting the resulting combined stream to a fractionation zone, removing and collecting a $C_4$ fraction characterized by a high octane number, as overhead, removing and collecting $C_7$ and heavier hydrocarbons as bottoms and removing an intermediate fraction consisting essentially of $C_6$ hydrocarbons; subjecting said intermediate fraction to demethylation in the presence of hydrogen under catalytic demethylation conditions of temperature and pressure; separating the demethylation effluent into light gaseous products including hydrogen and $C_1$ to $C_3$ hydrocarbons and recycling the remaining liquid demethylated product to said fractionation zone to extinction to produce principally a mixture of pentanes; separating the resulting pentane mixture into isopentane and normal pentane; subjecting the latter to isomerization in the presence of hydrogen under catalytic isomerization conditions of temperature and pressure; separating the isomerization effluent into light gaseous products including hydrogen and $C_1$ to $C_3$ hydrocarbons and recycling the remaining isomerized product to said fractionation zone, characterized by a high octane number; combining the light gaseous products resulting from the aforementioned reforming, demethylation and isomerization steps; separating hydrogen from said combined products and recycling apportioned streams of said separated hydrogen to said reforming, demethylation and isomerization operations.

3. A method for improving the quality, octane numberwise, of a $C_6$ containing petroleum hydrocarbon mixture which comprises subjecting the same to reforming in the presence of hydrogen under catalytic reforming conditions of temperature and pressure; separating the resulting reformer effluent into (1) light gaseous products including hydrogen and $C_1$ to $C_3$ hydrocarbons and (2) $C_4$ and heavier liquid products; conducting the latter to a fractionation zone, removing and collecting a $C_4$ fraction, characterized by a high octane number, as overhead, removing and collecting $C_7$ and heavier hydrocarbons as bottoms and removing an intermediate fraction consisting essentially of $C_6$ hydrocarbons; separating and collecting neohexane; characterized by a high octane number from said intermediate fraction; subjecting the remainder of said $C_6$ intermediate fraction to demethylation in the presence of hydrogen under catalytic demethylation conditions of temperature and pressure; separating the demethylation effluent into light gaseous products including hydrogen and $C_1$ to $C_3$ hydrocarbons and recycling the remaining liquid demethylated product to said fractionation zone to extinction to produce principally a mixture of pentanes; separating the resulting pentane mixture into isopentane and normal pentane; subjecting the latter to isomerization in the presence of hydrogen under catalytic isomerization conditions of temperature and pressure; separating the isomerization effluent into light gaseous products including hydrogen and $C_1$ to $C_3$ hydrocarbons and recycling the remaining isomerized product to said fractionation zone, characterized by a high octane number; combining the light gaseous products resulting from the aforementioned reforming, demethylation and isomerization steps, separating hydrogen from said combined products and recycling apportioned streams of said separated hydrogen to said reforming, demethylation and isomerization operations.

4. A method for improving the quality, octane numberwise, of a $C_6$-containing petroleum hydrocarbon mixture which comprises conducting the same to a reforming zone in the presence of hydrogen under catalytic reforming conditions of temperature and pressure; separating the resulting reformer effluent into (1) light gaseous products including hydrogen and $C_1$ to $C_3$ hydrocarbons and (2) $C_4$ and heavier liquid products; conducting the latter to a fractionation zone, removing and collecting a $C_4$ fraction, characterized by a high octane number, as overhead, removing and collecting $C_7$ and heavier hydrocarbons as bottoms and removing an intermediate fraction consisting essentially of $C_6$ hydrocarbons; conducting said intermediate fraction to a demethylation zone in the presence of hydrogen under catalytic demethylation conditions of temperature and pressure; separating the demethylation effluent into light gaseous products including hydrogen and $C_1$ to $C_3$ hydrocarbons and recycling the remaining liquid demethylated product to said fractionation zone to extinction to produce principally a mixture of pentanes; separating the resulting pentane mixture into isopentane and normal pentane; recycling the latter to said reforming zone wherein it undergoes isomerization to extinction to produce principally isopentane, characterized by a high octane number; combining the light gaseous products resulting from the aforementioned reforming and demethylation steps; separating hydrogen from said combined products and recycling apportioned streams of said separated hydrogen to said reforming and demethylation zones.

5. A method for improving the quality, octane numberwise, of a $C_6$-containing petroleum hydrocarbon mixture which comprises conducting the same to a reforming zone in the presence of hydrogen under catalytic reforming conditions of temperature and pressure; separating the resulting reformer effluent into (1) light gaseous products including hydrogen and $C_1$ to $C_3$ hydrocarbons and (2) $C_4$ and heavier liquid products; conducting the latter to a fractionation zone, removing and collecting a $C_4$ fraction characterized by a high octane number, as overhead, removing and collecting $C_7$ and heavier hydrocarbons as bottoms and removing an intermediate fraction consisting essentially of $C_6$ hydrocarbons; separating said intermediate fraction into isohexanes and normal hexane; recycling said separated normal hexane to said reforming zone wherein it undergoes isomerization to extinction to produce principally isohexanes, conducting said separated isohexanes to a demethylation zone in the presence of hydrogen under catalytic demethylation conditions of temperature and pressure; separating the demethylation effluent into light gaseous products including hydrogen and $C_1$ to $C_3$ hydrocarbons and recycling the remaining liquid demethylated product to said fractionation zone to extinction to produce principally a mixture of pentanes; separating the resulting pentane mixture into isopentane and normal pentane; recycling the latter to said reforming zone wherein it undergoes isomerization to extinction to produce principally isopentane, characterized by a high octane number; combining the light gaseous products resulting from the aforementioned reforming and demethylation steps; separating hydrogen from said combined products and recycling apportioned streams of said separated hydrogen to said reforming and demethylation zones.

6. A method for improving the quality, octane numberwise, of a $C_6$-containing petroleum hydrocarbon mixture which comprises conducting the same to a reforming zone in the presence of hydrogen under catalytic reforming conditions of temperature and pressure; separating the resulting reformer effluent into (1) light gaseous products including hydrogen and $C_1$ to $C_3$ hydrocarbons and (2) $C_4$ and heavier liquid products; conducting the latter to a fractionation zone, removing and collecting a $C_4$ fraction, characterized by a high octane number, as overhead, removing and collecting $C_7$ and heavier hydrocarbons as bottoms and removing an intermediate fraction consisting essentially of $C_6$ hydrocarbons; separating said intermediate fraction into isohexanes and normal hexane; conducting said separated isohexanes to a demethylation zone in the presence of hydrogen under catalytic demethylation conditions of temperature and pressure; separating the demethylation effluent into light gaseous products including hydrogen and $C_1$ to $C_3$ hydrocarbons and recycling the remaining liquid demethylated product to said fractionation zone to extinction to produce principally a mixture of pentanes; separating the resulting pentane mixture into isopentane and normal pentane; conducting the latter to an isomerization zone in the presence of hydrogen under catalytic isomerization conditions of temperature and pressure; conducting the aforesaid separated normal hexane to said isomerization zone; separating the isomerization effluent into light gaseous products including hydrogen and $C_1$ to $C_3$ hydrocarbons and recyling the remaining product to said fractionation zone to extinction to produce principally isopentane, characterized by a high octane number; combining the light gaseous products resulting from the aforementioned reforming, demethylation and isomerization steps; separating hydrogen from said combined products and recycling apportioned streams of said separated hydrogen to said reforming, demethylation and isomerization zones.

7. A method for improving the quality, octane numberwise, of a $C_6$-containing petroleum hydrocarbon mixture which comprises subjecting the same to reforming in the presence of hydrogen under catalytic reforming conditions of temperature and pressure; separating the resulting reformer effluent into (1) light gaseous products including hydrogen and $C_1$ to $C_3$ hydrocarbons and (2) $C_4$ and heavier liquid products; conducting the latter to a fractionation zone, removing a $C_4$ fraction as overhead, removing and collecting $C_7$ and heavier hydrocarbons as bottoms and removing an intermediate fraction consisting essentially of $C_6$ hydrocarbons; separating said $C_4$ overhead fraction into butane and isobutane and separately collecting these products, characterized by a high octane number; conducting said intermediate fraction to a primary demethylation zone in the presence of hydrogen under catalytic demethylation conditions of temperature and pressure; separating the primary demethylation effluent into light gaseous products including hydrogen and $C_1$ to $C_3$ hydrocarbons and recycling the remaining liquid primary demethylated product to said fractionation zone to extinction to produce principally a mixture of pentanes; separating the resulting pentane mixture into isopentane and normal pentane; recycling said separated normal pentane to said reforming zone wherein it undergoes isomerization to extinction to produce principally isopentane; conducting said separated isopentane to a secondary demethylation zone in the presence of hydrogen under catalytic reforming conditions of temperature and pressure; separating the secondary demethylation effluent into light gaseous products including hydrogen and $C_1$ to $C_3$ hydrocarbons and recycling the remaining liquid secondary demethylated product to said fractionation zone to extinction to produce principally isobutane, characterized by a high octane number; combining the light gaseous products resulting from the aforementioned reforming, primary demethylation and secondary demethylation steps; separating hydrogen from said combined products and recycling apportioned streams of said separated hydrogen to said reforming, primary demethylation and secondary demethylation zones.

8. A method for improving the quality, octane numberwise, of a $C_6$-containing petroleum hydrocarbon mixture which comprises conducting the same to a reforming zone in the presence of hydrogen under catalytic reforming conditions of temperature and pressure; separating the resulting reformer effluent into (1) light gaseous products including hydrogen and $C_1$ to $C_3$ hydrocarbons and (2) $C_4$ and heavier liquid products; conducting the latter to a fractionation zone, removing and collecting a $C_4$ fraction, characterized by a high octane number, as overhead, removing and collecting $C_7$ and heavier hydrocarbons as bottoms and removing an intermediate fraction consisting essentially of $C_5$–$C_6$ hydrocarbons; bringing said intermediate fraction into contact with a crystalline zeolite having pores sufficiently large to permit passage of the normal $C_5$–$C_6$ components and sufficiently small to exclude passage of the iso $C_5$–$C_6$ components; recycling the resulting separated normal $C_5$–$C_6$ components to said reforming zone; wherein they undergo isomerization, fractionating the resulting separated iso $C_5$–$C_6$ components to yield isohexanes and isopentane; conducting said isohexanes to a demethylation zone in the presence of hydrogen under catalytic demethylation conditions of temperature and pressure; separating the demethylation effluent into light gaseous products including hydrogen and $C_1$ to $C_3$ hydrocarbons and recycling the remaining liquid demethylated product to said fractionation zone to extinction to produce principally isopentane; collecting the aforesaid isopentane, characterized by a high octane number; combining the light gaseous products resulting from the aforementioned reforming and demethylation steps; separating hydrogen from said combined products and recycling apportioned streams of said separated hydrogen to said reforming and demethylation zones.

9. A method for improving the quality, octane numberwise, of a $C_6$-containing petroleum hydrocarbon mixture which comprises conducting the same to a reforming zone in the presence of hydrogen under catalytic reforming conditions of temperature and pressure; separating the resulting reformer effluent into (1) light gaseous products including hydrogen and $C_1$ to $C_3$ hydrocarbons and (2) $C_4$ and heavier liquid products; conducting the latter to a fractionation zone, removing and collecting a $C_4$ fraction, characterized by a high octane number, as overhead, removing and collecting $C_7$ and heavier hydrocarbons as bottoms and removing an intermediate fraction consisting essentially of $C_5$–$C_6$ hydrocarbons; bringing said intermediate fraction into contact with a crystalline zeolite having pores sufficiently large to permit passage of the normal $C_5$–$C_6$ components and sufficiently small to exclude passage of the iso $C_5$–$C_6$ components; conducting the separated normal $C_5$–$C_6$ components to an isomerization zone in the presence of hydrogen under catalytic isomerization conditions of temperature and pressure; separating the isomerization effluent into light gaseous products including hydrogen and $C_1$ to $C_3$ hydrocarbons and recycling the remaining product to said fractionation zone to extinction to produce principally isopentane; fractionating the separated iso $C_5$–$C_6$ components to yield isohexanes and isopentane; conducting said isohexanes to a demethylation zone in the presence of hydrogen under catalytic demethylation conditions of temperature and pressure; separating the demethylation effluent into light gaseous products including hydrogen and $C_1$ to $C_3$ hydrocarbons and recycling the remaining liquid demethylated product to said fractionation zone to extinction to produce principally isopentane; collecting the aforesaid isopentane; combining the light gaseous products resulting from the aforementioned reforming, demethylation and isomerization steps; separating hydrogen from said combined products and recycling apportioned streams of said separated hydrogen to said reforming, demethylation and isomerization zones.

References Cited in the file of this patent

UNITED STATES PATENTS

| | | |
|---|---|---|
| 2,422,671 | Haensel et al. | June 24, 1947 |
| 2,703,308 | Oblad et al. | Mar. 1, 1955 |
| 2,721,884 | Ruedisulj | Oct. 25, 1955 |
| 2,740,751 | Haensel et al. | Apr. 3, 1956 |
| 2,758,062 | Arundale et al. | Aug. 7, 1956 |
| 2,780,661 | Hemminger et al. | Feb. 5, 1957 |
| 2,905,619 | Sutherland | Sept. 22, 1959 |